F. RAYMOND.
Grain Bin.

No. 105,367.    Patented July 12, 1870.

Witnesses    Inventor

United States Patent Office.

FITCH RAYMOND, OF CLEVELAND, OHIO, ASSIGNOR FOR ONE-HALF TO A. MILLER, OF SAME PLACE.

Letters Patent No. 105,367, dated July 12, 1870.

IMPROVEMENT IN GRAIN-BINS.

The Schedule referred to in these Letters Patent and making part of the same

I, FITCH RAYMOND, of Cleveland, in the county of Chuyahoga and State of Ohio, have invented certain new and useful Improvements in Grain-Bins.

The nature of my invention relates to a certain arrangement of bins for storing wheat, corn, &c., whereby the grain is protected from dampness, rust, molding, and heating, by subjecting the same to an impelled current or currents of heated or cold air, when in said bin, as hereinafter set forth and described, and whereby the grain in the bin may be fumigated or perfumed by impregnating or charging the air so forced in with any disinfectant or perfume or vaporized substance, as desired.

In the accompanying drawing—

Figure 1:
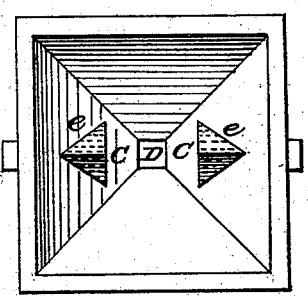
Figure 1 represents a plan view of a grain-bin.

The drawing merely illustrates the invention, which, for the sake of convenience, is sustained in an upright position, between and upon two legs, and might as well be in any form desired, as in the one shown I make no claim upon the general form of the vessel.

B represents the platform.

A A, the legs.

E E and E' E', the pipes or conduits through which the air is to be conducted into the bins.

C C are the caps, strainers, or air-chamber, through which the air is to be admitted into the grain, and by which the grain is to be held within the bin.

Figure 2:
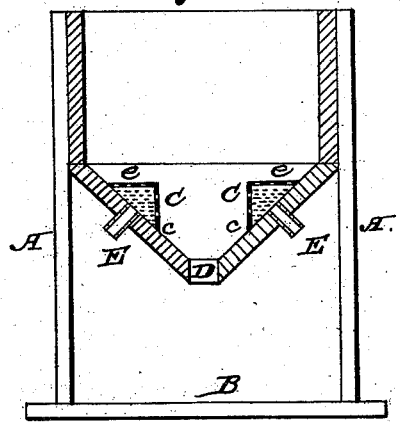
Figure 2 is a vertical central sectional view, illustrating one form of my device.

C' C' are the wire-cloth or strainers, which are fastened over the openings on the inner side of the bin, and answer the same purpose as the above-described strainers shown by fig. 2.

d d are air-chambers cut in the walls of the bin, and

D is the exit for the grain at the bottom, to be opened and closed in any of the usual modes.

The form of ventilators shown at C C seem best adapted to use where the walls of the bins are not vertical, but sloping, as shown in the drawing, as the air forced in through the pipes E E would enter through the perforations e e in the top, and those in the side c c at the same time, and they may be made of strong wire-cloth or perforated metal, or other material suitable for the purpose, and properly fastened to the walls of the bin, and sustained in proper form and position by suitable frames of wood or metal fastened also to the walls.

Perforated metal plates are deemed better for this form of device, as they are stronger, and less liable to be stopped up by the grain than the other form hereinafter described.

The holes should be punched from the outer side of the plate, because in that case the air from the outside would be facilitated in its entrance by the form of the orifice, while the jagged points made by the operation of punching on the inner side would tend to prevent the grain from choking up the perforations.

The perforations should be as large as may be, without being large enough for the passage of the grain.

Figure 3:
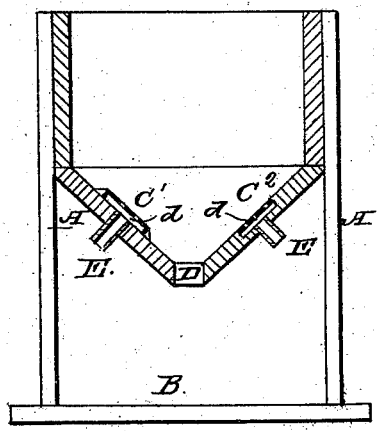
Figure 3, a like view, illustrating another form of the same.

The form shown in C' C', in fig. 3, may be used upon the bottom and upon the walls, whether inclined or perpendicular.

The pipes E' E' may be fixed in holes bored from the outside through a part of the thickness of the walls, and larger recesses should be cut for air-chambers $d\ d$ on the inner side, and the strainer of wire-cloth or other suitable material, $f\ f$, fastened over the recesses on the inner sides of the walls, and flush therewith.

There may be any desired number of either or both forms of these devices on either the sides or bottoms of the vessels.

The number, size, and location, should depend, of course, upon the form and size of the vessel; but, if deemed expedient, the pipe E and air-chamber $d$, in the form shown at $C^2$, fig. 3, may be cast in one piece of metal, space being made in the timber of the wall for the chamber, and a hole bored for the pipe E, or the piece so cast may be located as shown at $C^1$, fig. 3, the air-chamber being wholly within the vessel, and the pipe extending through from the inner surface of the wall through it.

In either case the perforated metal, wire-cloth, or other like material, should be fastened over the top of the chamber, to close it against grain, but admit the air from it into the bin.

By means of these devices, and with the aid of any good blowing apparatus, pure air may be forced into every portion of the mass of grain, and be made to carry off the surplus heat, moisture, and the infectious vapors of decay.

What I claim as new, and desire to secure by Letters Patent, is—

In combination with the grain-bin, an air-chamber or cavity, constructed substantially as described, and arranged within or upon the walls, sides, or bottom of said bin, and provided with coverings of wire-gauze, perforated metal, or equivalents, and air-conduits, operating conjointly as and for the purpose hereinbefore described.

FITCH RAYMOND.

Witnesses:
M. MORLEY,
A. M. STINT, Jr.